(12) United States Patent
Nikovski et al.

(10) Patent No.: US 9,946,241 B2
(45) Date of Patent: Apr. 17, 2018

(54) MODEL PREDICTIVE CONTROL WITH UNCERTAINTIES

(71) Applicant: Mitsubishi Electric Research Laboratories, Inc., Cambridge, MA (US)

(72) Inventors: Daniel Nikolaev Nikovski, Brookline, MA (US); Stefano Di Cairano, Somerville, MA (US); Yiming Zhao, Houston, TX (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 524 days.

(21) Appl. No.: 14/628,408

(22) Filed: Feb. 23, 2015

(65) Prior Publication Data

US 2016/0246277 A1 Aug. 25, 2016

(51) Int. Cl.
G05B 13/00 (2006.01)
G05B 19/042 (2006.01)
G05B 13/04 (2006.01)

(52) U.S. Cl.
CPC ....... *G05B 19/0426* (2013.01); *G05B 13/048* (2013.01)

(58) Field of Classification Search
None
See application file for complete search history.

(56) References Cited

U.S. PATENT DOCUMENTS

| 6,064,809 | A | * | 5/2000 | Braatz | G05B 13/048 |
| | | | | | 700/37 |
| 7,376,472 | B2 | | 5/2008 | Wojsznis et al. | |
| 7,856,281 | B2 | | 12/2010 | Thiele et al. | |
| 2001/0021900 | A1 | * | 9/2001 | Kassmann | G05B 13/048 |
| | | | | | 703/2 |

* cited by examiner

*Primary Examiner* — Paul Yanchus, III
(74) *Attorney, Agent, or Firm* — Gene Vinokur; James McAleenan; Hironori Tsukamoto

(57) ABSTRACT

A method for controlling an operation of a machine according to a model of the machine having uncertainties determines a set of triples of data points representing the operation of the machine over a period of time. Each triple of data points in the set includes two subsequent states of the machine and corresponding control input causing a transition of the machine between the subsequent states. Next, the method determines a current model of the machine based on the set of triples of data points, such that the current model is within a feasible space of models of the machine corresponding to a polytope with vertices defined by base models representing extreme values of different parameters of the model.

15 Claims, 14 Drawing Sheets

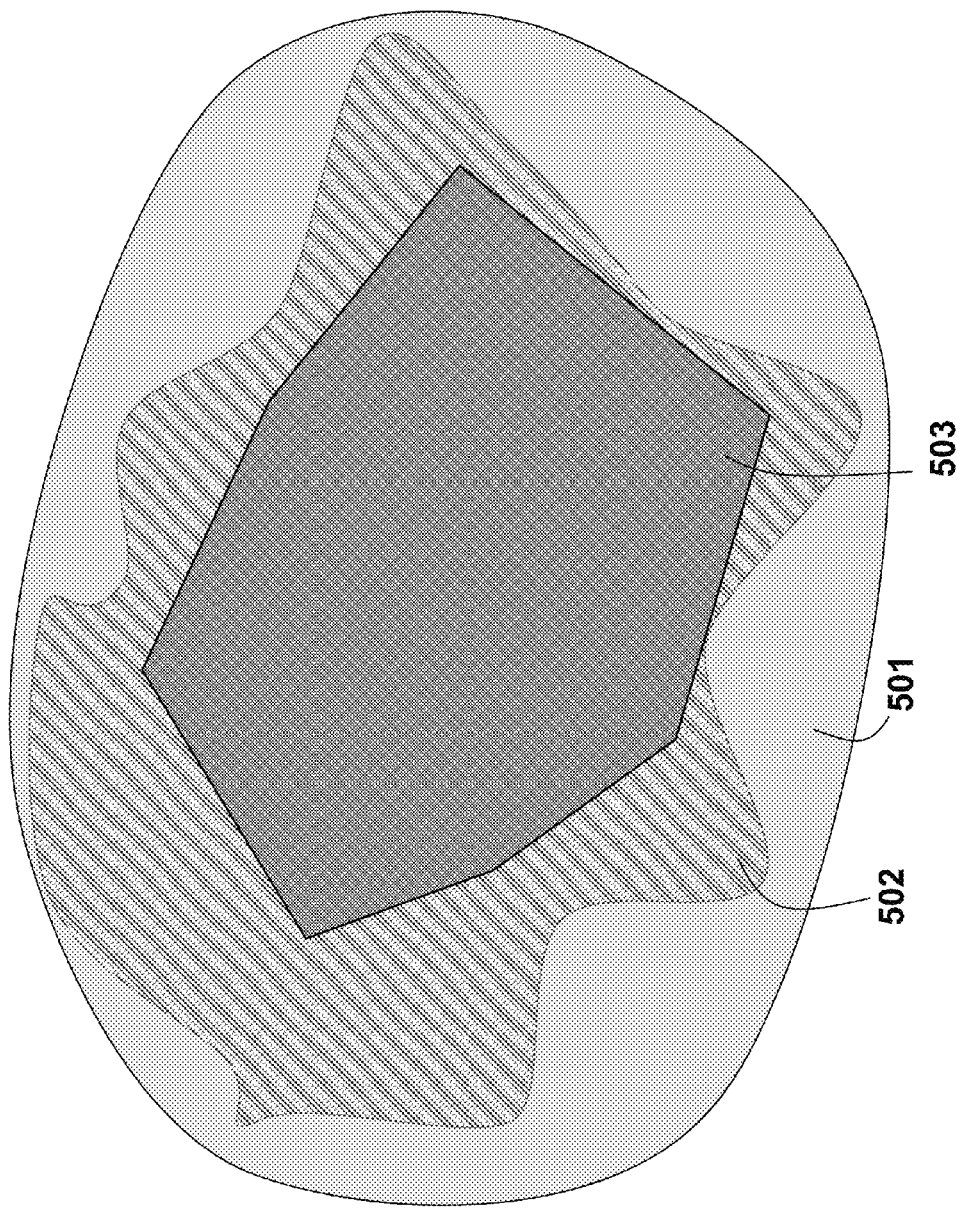

MODEL PREDICTIVE CONTROL WITH UNCERTAINTIES

FIELD OF THE INVENTION

This invention relates generally to controlling an operation of a machine, and more particularly to controlling the operation using a model predictive control (MPC) over a receding horizon.

BACKGROUND OF THE INVENTION

In machine control, a controller, which can be implemented using one or combination of software or hardware, generates commands values for control inputs to a machine based on measurements obtained, e.g., from sensors and/or estimators, from outputs of the machine. The controller selects the input so that the machine operates as desired, for instance, the operation follows a desired reference profile, or regulates the outputs to a specific value. In several cases, the controller enforces constraints on the inputs and outputs of the machine, for instance, ensuring the corresponding variables are in some predetermined ranges to ensure safe machine operation from a physical or functional specification. In order to enforce such constraints, the controller often uses a model of the machine to predict what behavior the machine produces when a command, i.e., a control input, is applied. One example of a process in a controller that is capable of achieving control of a machine while enforcing constraints on the machine inputs and outputs is model predictive control (MPC).

The MPC is based on an iterative, finite horizon optimization of a model of a machine and has the ability to anticipate future events to take appropriate control actions. This is achieved by optimizing the operation of the machine over a future finite time-horizon subject to constraints, and only implementing the control over the current timeslot. For example, the constraints can represent physical limitation of the machine, safety limitations on the operation of the machine, and performance limitations on a trajectory of the machine. A control strategy for the machine is admissible when the motion generated by the machine for such a control strategy satisfies all the constraints. For example, at time t, the current state of the machine is sampled and an admissible cost minimizing control strategy is determined for a relatively short time horizon in the future. Specifically, an online or real-time calculation determines a cost-minimizing control strategy until time t+T. After the first step of the control is implemented, the state is sampled again and the calculations are repeated starting from the now current state, yielding a new control and new predicted state path. The prediction horizon shifts forward, and for this reason MPC is also called receding horizon control.

The MPC can be used to generate the actual trajectory of the motion of the machine based on a model of the system and the desired reference trajectory by solving an optimal control problem over a finite future time subject to various physical and specification constraints of the system. The MPC aims for minimizing performance indices of the motion of the machine, such as an error between a reference and an actual motion of the machine, or the machine energy consumption, or the induced system vibration.

Because the MPC is a model-based framework, the performance of the MPC inevitably depends on the quality of the prediction model used in the optimal control computation. However, in most cases, the model for the machine dynamics is unknown a priori, as some parameters are not measured precisely. Thus, the controller may need to estimate unknown parameters of the model of the machine, during already occurred operation of the machine, and thus, also enforce constraints while the parameters are estimated. The conventional approaches to handle such problems include adaptive or learning-based MPC, where an MPC control problem is augmented with a closed-loop identification scheme in order to learn the unknown machine parameters. By learning the unknown parameters, the operation of the machine achieved by the controller is improved.

However, in a number of applications, it is not possible to determine the precise model of the system off-line. In some of those applications, the model of the system is obtained by means of system identification from collected measurement data and the uncertainty of the model is usually assumed to be normally distributed, see, e.g., U.S. Pat. No. 7,856,281. However, such distribution of the uncertainties of the model results in infinite variations of the model of the system that coupled with the predictive nature of the MPC can lead to suboptimal or even unfeasible solutions, see, e.g., a method described in U.S. Pat. No. 7,376,472.

Accordingly, there is a need for a method for controlling an operation of a machine using the MPC while determining parameters of the model of the machine.

SUMMARY OF THE INVENTION

Some embodiments of the invention are based on recognition that the uncertainty of the model can be bounded by a range of possible variations of parameters of the model. For example, in applications for controlling movement of trains, a mass of a train can vary due to, e.g., a number of passengers boarding the train at the specific time of the control, but can be bounded by variations between the mass of an empty train and the mass of the fully loaded train. Similarly, a friction between the wheels of the train and the rails can vary for different weather conditions, but can be bounded by the frictions of the icy and dry conditions.

As a result, the model of the system belongs to the polytope defined by the convex hull of the base models representing the extreme values of various parameters of the model. For example, if only two parameters of the model can vary, as in the abovementioned example, the polytope is two-dimensional, and the vertices of that polytope are base models with different possible combinations of the extreme values of the parameters of the mass of the train and the friction with the rails. In practice, however, many parameters of the model can vary, and the polytope is multi-dimensional, but is of finite volume and convex.

In different embodiments, a large number of parameters of the system can vary resulting in multi-dimensional polytope of the feasible space of the parameters. Thus, it can be difficult to define the constraints for the polytope of such a complexity. It can also be difficult to solve the constrained optimization problem subject to a multitude of the constraints.

Some embodiments of the invention are based on another realization that because the polytope of the feasible space is convex, the current model that needs to be identified can be defined in barycentric coordinates on the polytope. The barycentric coordinate system is a coordinate system in which the location of a point of a shape is specified as a convex combination of the coordinates of the vertices of a bounding volume, such as a polytope. Coordinates that extend outside the volume are negative. Knowing the values of the barycentric coordinates and the values of the vertices in a Cartesian coordinate system, it is possible to determine the value of the point in the Cartesian coordinate system.

When the current model is identified in the barycentric coordinates on the polytope, it is possible to specify barycentric constraints on the barycentric coordinates ensuring that the current model is within the polytope. Specifically, the barycentric constraints include a constraint that all barycentric coordinates of the current model are non-negative to ensure that the current model is within the polytope and a constraint that a sum of all barycentric coordinates of the current model equals one. Thus, the constrained optimization can be simplified using the barycentric coordinate system.

The current model identified by various embodiments can be seen as a convex combination of a set of pre-defined base models. It is often the case, however, that the determination of the current model includes disturbance, i.e., uncertainties in the parameters of the model. Accordingly, some embodiments of the invention determine a probability distribution over such convex combinations. However, if the uncertainties in the parameters are quantified to be random with multivariate normal distribution, the disturbance becomes unbounded and the possible models of the system can be outside of the feasible space of the polytope.

Accordingly, some embodiments of the invention determine the probability distribution over the parameters of the current model using an empirical density function over possible models determined using different subsets of the measurement data, following the bootstrap method with replacement.

Some embodiments of the invention are based on recognition that in some situations, there are multiple possible combinations of the barycentric coordinates defining the current model. In the embodiments estimating the current model deterministically, that would not be a problem, i.e., any combination of the barycentric coordinates define the current model. However, in embodiments estimating the current model stochastically, different combination of the barycentric coordinates can result in different probability distributions. Accordingly, some embodiments of the invention select the barycentric coordinates of the current model using generalized barycentric coordinates (GBC) method, such that a variation of the current model results in the proportional variation of the barycentric coordinates.

Some embodiments of the invention are based on the realization that it is possible to provide a model predictive control (MPC) method with enforcement of the constraints on the operation of a machine and fast convergence to a value of a parameter of a model of the machine by using constraints on values of control inputs that can be applied to each state of the machine while guaranteeing that the constraints on the operation on the machine are not violated for any admissible value of the parameters of the model. In some embodiments, the control strategy of the MPC is to jointly optimize a performance of the control and a rate of the estimation of the parameters.

Some embodiments are based on the realization that it is possible to enforce constraints on a family of models defined based on an admissible range for the uncertain values of the machine parameters. The family of models provides a set of feasible states. For example, a special subset of these feasible states can be designed such that, for all states in this subset, there is a feasible control input that maintains the states in that subset for all values of the unknown machine parameters within their known ranges.

It is further realized that is possible to control the system using MPC such that the optimized input maintains the state in the special subset. This guarantees that the system controlled by the MPC always satisfies all the constraints including the case when the parameters are uncertain.

Accordingly, one embodiment discloses a method for controlling an operation of a machine according to a model of the machine having uncertainties. The method includes determining a set of triples of data points representing the operation of the machine over a period of time, wherein a triple of data points in the set includes two subsequent states of the machine and corresponding control input causing a transition of the machine between the subsequent states; and determining a current model of the machine based on the set of triples of data points, such that the current model is within a feasible space of models of the machine corresponding to a polytope with vertices defined by base models representing extreme values of different parameters of the model. The steps of the method are performed by a processor of a controller.

Another embodiment discloses a method for controlling an operation of a machine according to a model of the machine having uncertainties. The method includes controlling the machine iteratively over a set of control steps; storing, at each control step, a triple of data points to form a set of triples of data points, wherein the data points in the triple define two subsequent states of the machine and corresponding control input causing a transition of the machine between the subsequent states; and determining a current model of the machine based on the set of triples of data points, such that the current model is within a feasible space of models of the machine corresponding to a polytope with vertices defined by base models representing extreme values of different parameters of the model. The steps of the method are performed by a controller.

Yet another embodiment discloses a controller for controlling an operation of a machine according to a model of the machine having uncertainties. The controller includes a memory for storing a model of the machine having uncertainties; and a processor for controlling the machine iteratively over a set of control steps according to the model, got storing in the memory a set of triples of data points representing the operation of the machine over a period of time, wherein a triple of data points in the set includes two subsequent states of the machine and corresponding control input causing a transition of the machine between the subsequent states, and for updating the model such that the model is within a feasible space of models of the machine corresponding to a polytope with vertices defined by base models representing extreme values of different parameters of the model, wherein the processor updates the model by solving a constrained optimization problem minimizing an error between the set of triples of data points and an estimated set of triples of data points estimated using the model, wherein the constrained optimization problem is subject to barycentric constraints enforcing that the generalized barycentric coordinates of the model are non-negative and a sum of the generalized barycentric coordinates of the model equals to one.

BRIEF DESCRIPTION OF THE DRAWINGS

FIG. 5B is a schematic showing the relation between the feasible region of the states of the machine and control invariant subsets determined according to some embodiments of the invention;

DETAILED DESCRIPTION OF THE PREFERRED EMBODIMENT

Figure 1A:
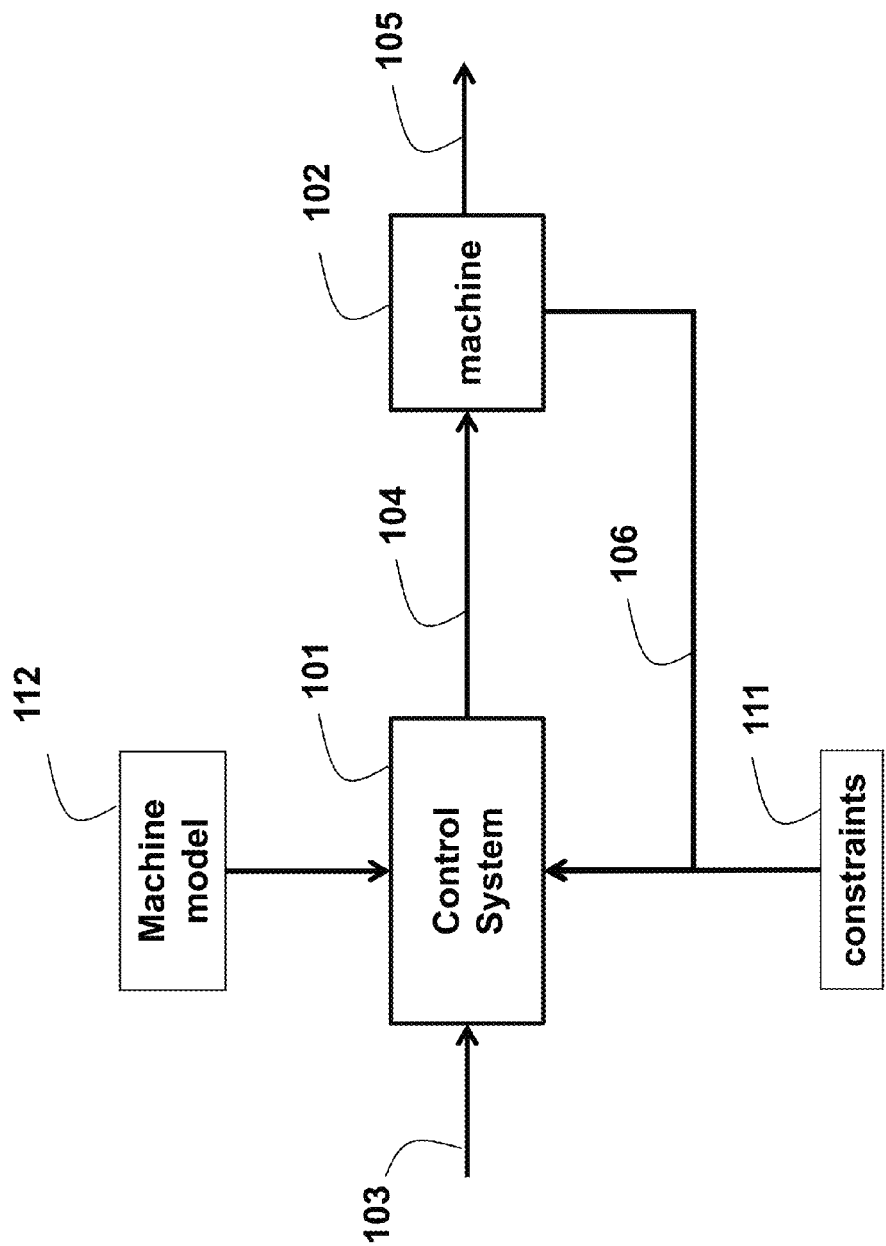
FIG. 1A is a block diagram of a controller for controlling an operation of a machine according to one embodiment of the invention.

FIG. 1A shows a block diagram of a control system 101 for controlling an operation of a machine 102. The machine 102 is a device whose operation changes quantities such as positions, velocities, currents, temperatures, numerical values, in response to commands. As used herein, the operation of the machine determines a motion of the machine that changes such quantities. The control system receives a desired motion 103 for the machine, such as a desired trajectory or target point for some of the quantities, and controls the machine via control inputs 104. The control inputs can include commands to change parameters of the operation of the machine or can include actual values of the parameters such as voltages, pressures, torques, forces that affect the machine motion resulting in the generation of quantities 105 for the machine.

The control system 101 receives information 106 about the machine motion, from sensors, hardware, or software connected directly or remotely to the machine. The information 106 includes a state of the machine. The machine uses the state for the selection of the control inputs 104. The information 106 can include some or all of the motion quantities 105 and can also include additional information about the machine. The quantities 105, the control inputs 104 or a combination thereof, can be requested to remain in some pre-defined ranges according to constraints 111 on the operation of the machine.

Figure 1B:
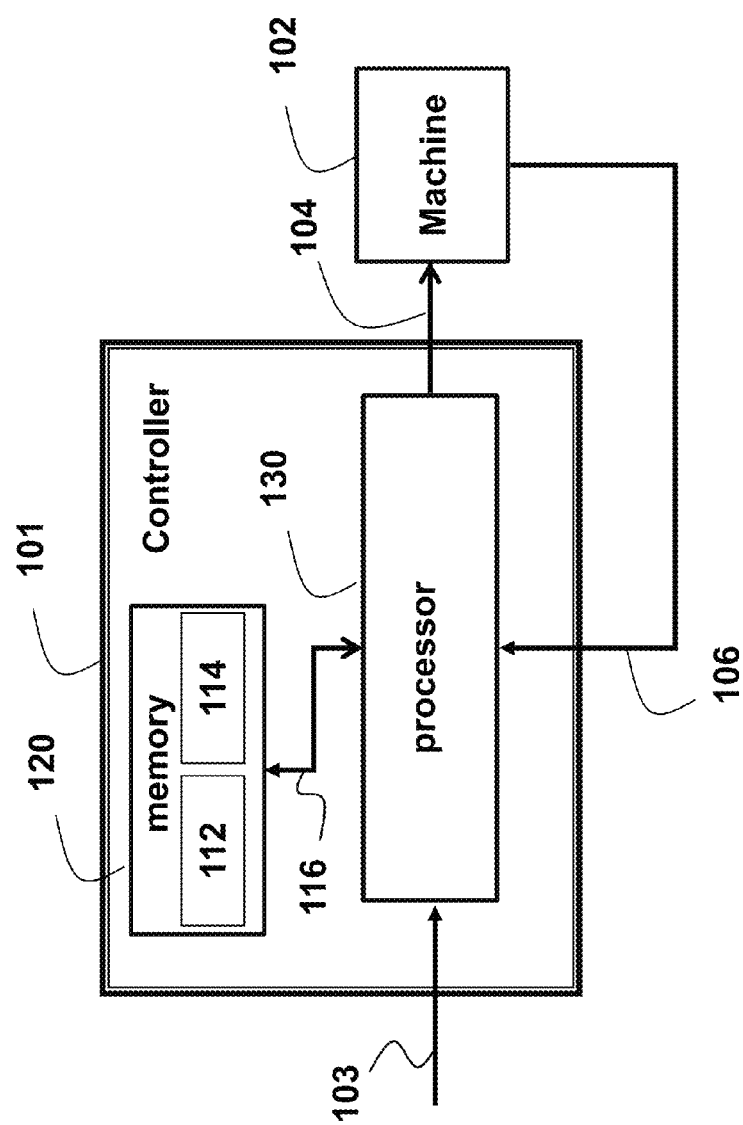
FIG. 1B is a block diagram of a general structure of the controller of FIG. 1A according to one embodiment of the invention.

FIG. 1B shows a general structure of the control system 101 according one embodiment of the invention. The control system 101 includes at least one processor 130 for executing modules of the controller. The processor 130 is operatively connected to a memory 120 for storing the model 112, e.g., parameters of the model and the triples of data points 114 representing the operation of the system over a period of time. A triple of data points in the set can include two subsequent states of the system and corresponding control input causing a transition of the system between the subsequent states. It is an objective of some embodiments of the invention to update 116 the model of the machine during the operation based on the set of triples of data points 114.

Figure 2A:
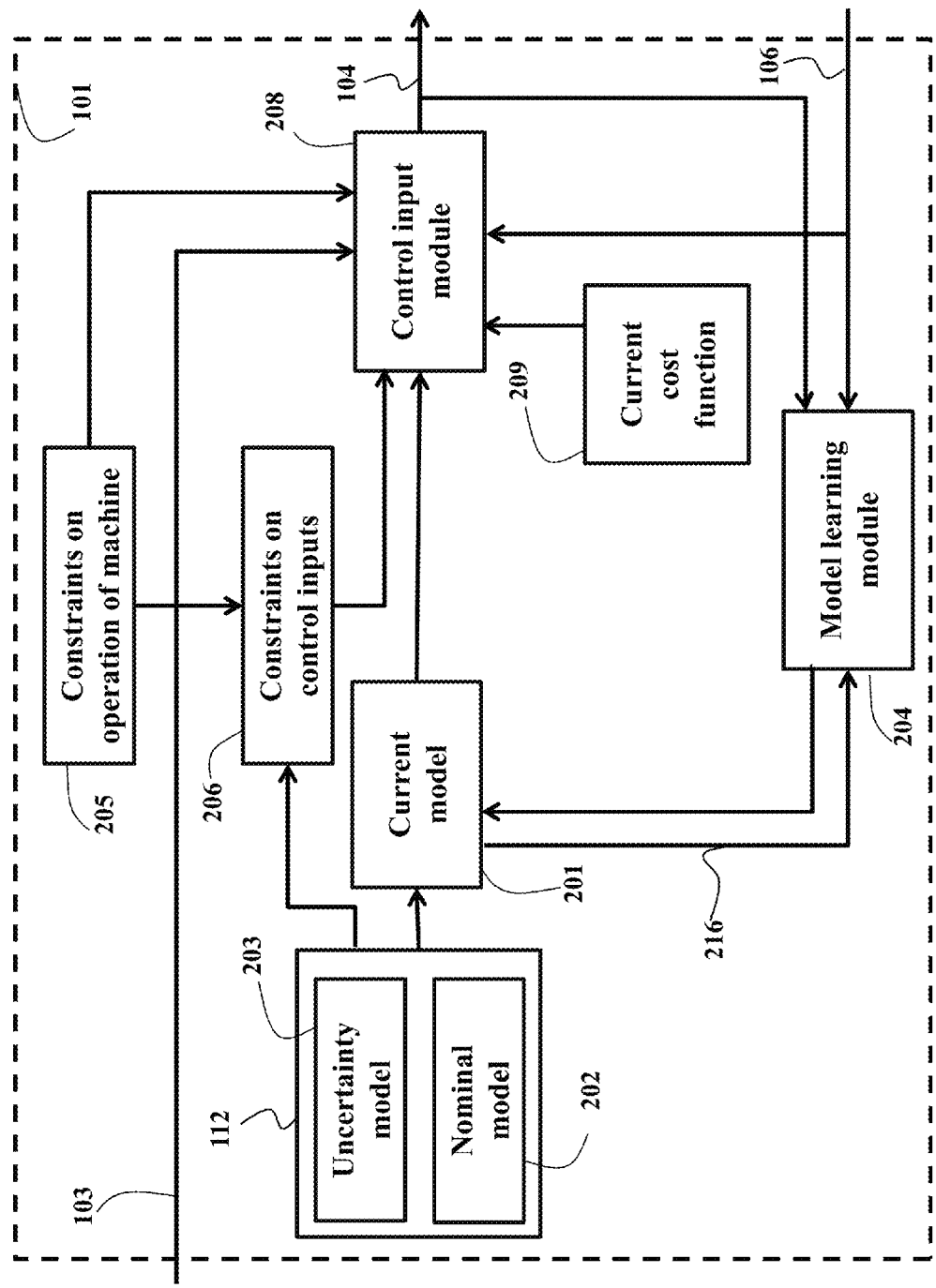
FIG. 2A is a block diagram of various modules of the controller according to one embodiment of the invention.

FIG. 2 shows a block diagram of various modules of the control system 101 according to one embodiment of the invention. In some embodiments of the invention, MPC or the model of the machine includes at least one parameter of uncertainty. For example, a model of robotic arm can include an uncertainty about a mass of the arm carrying an object. A model for the movement of a train can include an uncertainty about a friction of the wheels with the rails in current weather conditions. In some embodiments, the control system 101 is used to determine the uncertainties of the model and the control input according to such uncertainties.

In some embodiments, the model of the machine includes a nominal model 202 defining relationships among parameters of the model 112 and an uncertainty model 203 defining a range of values for at least one parameter of the model 112 and/or the nominal model 202. The combination of the nominal and uncertainty models define a union of base models representing extreme values of different parameters of the model.

For example, the parameters of the nominal model can use default values of the parameters. For example, the nominal model 202 can describes the motion of the machine in ideal conditions. However, the machine is subject to external effects, such as wear, external actions, variations due to time and weather, inexactly known physical quantities due to imperfections in the manufacturing process or measurement errors, and hence the actual motion of the machine is not exactly the same as the one of the nominal model. For example, one embodiment, starting from a nominal model, update the current model iteratively until the current model is in line with the observed machine motion, in terms of the sequence of the machine state values.

Some of the machine quantities need to remain in desired ranges defined by constraints 205 on the operation of the machine Some embodiments of the invention are based on the additional realization that constraints 206 on the control inputs can be determined from constrains 205 on the operation of the machine considering the uncertainty model 203. For example, the constraints 206 on the control inputs are determines such that the machine 102 controlled by the control inputs 104 satisfying the constraints 206 are guaranteed to satisfy the constraints 206 for all variations of the values of the parameters of the model within the admissible range defined by the uncertainty model 203.

In some embodiments, the constraints 206 are determined offline and the constraint 205 are not used for the controlling of the machine. In some embodiments, the constraints 206 are used in combination with at least some constraints 205 for controlling the machine.

In some embodiments, the control inputs 104 are determined based on an optimization of a cost function 209, e.g., subject to constraints 206 on the control inputs. The cost function can include terms for determining values for the control input according to an objective of the operation.

Accordingly, in some embodiments, various modules of the control system 101 achieve the control of the machine satisfying the objectives of the operation of the machine while updating the parameters of the model of the machine within the range of values defined by the nominal model and the uncertainty model of the machine using the optimization of the cost function including different terms for different objectives of the control.

The control system includes a memory 120 for storing the model of the machine and the processor 130 for executing modules of the controller. The modules include a control input module 208 for determining a current control input 104 for the controlling during a current iteration by optimizing the cost function 209. The control input module optimizes the current cost function using a current model 201 of the machine subject to constraints 206 on the current control input.

The control system also includes a model learning module 204 for determining the current model 201 of the machine, such that a current value of the parameter of the current model is with the range of values defined by the nominal model 202 and the uncertainty model 203 and reduces a difference between a state 106 of the machine resulted from the controlling the machine and an estimated state 216 estimated using the model of the machine.

Figure 2B:
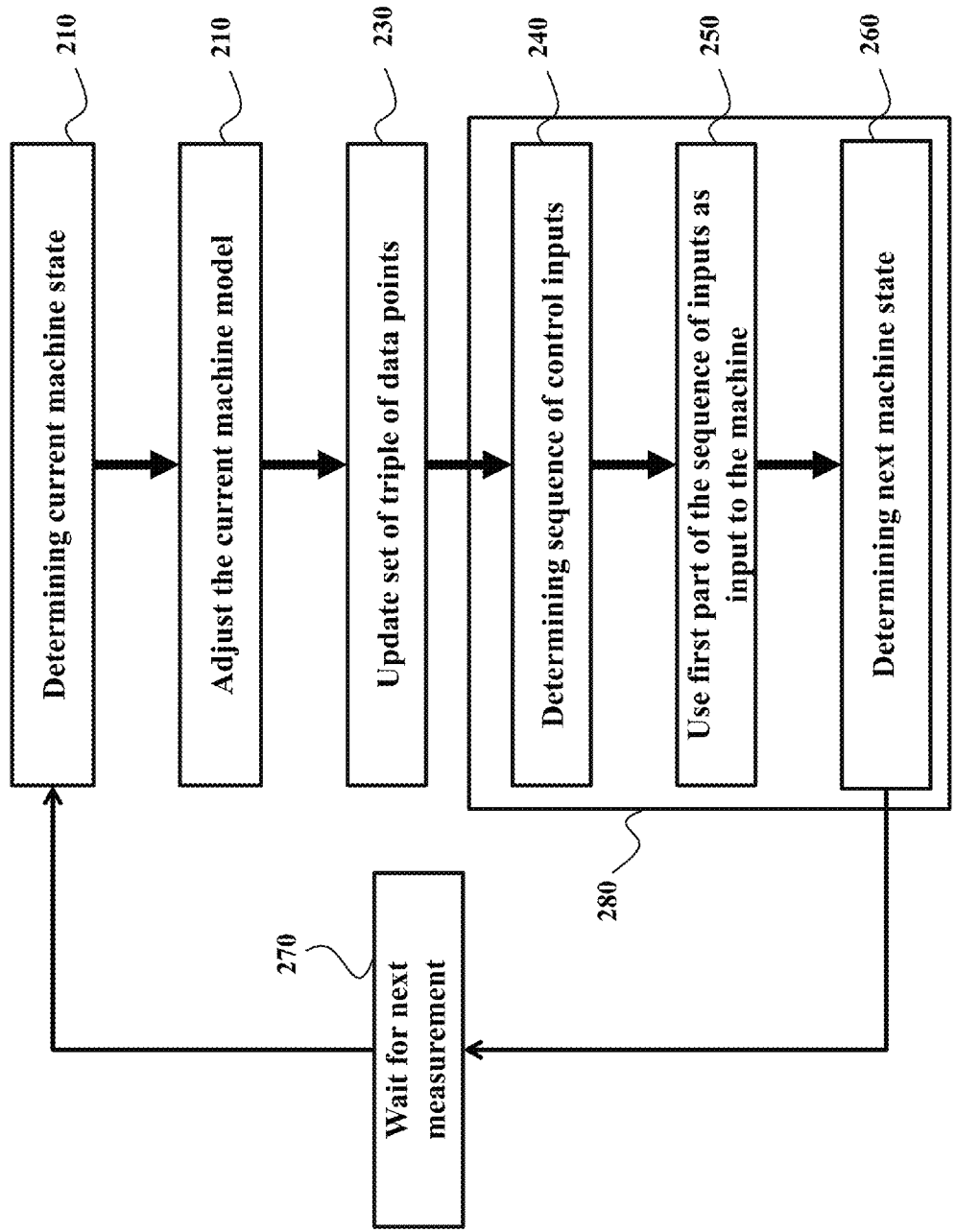
FIG. 2B is a block diagram of a method executed by the modules of the controller according to one embodiment of the invention.

FIG. 2B shows a block diagram of a method executed by the modules of the control system 101. The method controls iteratively 207 the operation of the machine with control inputs determined using the model of the machine based on an optimization of a cost function. The method determines 210 a current state of the machine resulted from the controlling with a previous control input determined for a previous iteration by optimizing the cost function using a previous model of the machine.

The method determines 220 a current model of the machine to reduce a difference between the measured current state and a state estimated using the previous model of the machine, such that a current value of the parameter of the current model is with the range of values. The method determines the current model of the machine based on the set of triples of data points. A triple of data points in the set includes two subsequent states of the system and corresponding control input causing a transition of the system between the subsequent states, and the method updates 230 the set of triples of data points based on the current state 210 and the state 210 and a control input 250 determined at a previous iteration.

Next, the method determines 280 a current control input for the controlling at the current iteration using the current model 210. For example, the method uses the current machine model to determine 240 a sequence of future inputs, from current time instant for a fixed amount of time in the future, long at least as the to obtain a new machine state measurement, such that the predicted future machine states and inputs satisfies the constraints on the control inputs. The first part of the input sequence, for duration equal to the amount of time needed to obtain a new measurement of the state of the machine, is applied 250 as current control input to the machine. Based on the current state of the machine, current model of the machine, and current control input to the machine, the next state of the machine is determined 260, and the controller waits 270 until a new state measurement is received.

Determining Model

Some embodiments of the invention are based on the realization that even if the true values of the parameters of the models are uncertain, the uncertainties of the parameters of the model are within the known range. For example, the mass of the train can be within a range of values for an empty train and fully loaded train. Similarly, friction between the wheels of the train and the rails can vary for different weather conditions, but can be bounded by the frictions of the icy and dry conditions. Also, the disturbances on the values of the parameters of the model can be bounded. The uncertainty model 203 represents the rages for the possible values of at least one parameter of the model, such that a combination of the nominal model and the uncertainty model can be used to determine a current model of the machine for the MPC.

As a result, the model of the system belongs to the polytope defined by the convex hull of the base models representing the extreme values of various parameters of the model. For example, if only two parameters of the model can vary, as in the abovementioned example, the polytope is two-dimensional, and the vertices of that polytope are models with different possible combinations of the extreme values of the parameters, such as the mass of the train and the friction with the rails. In practice, however, many parameters of the model can vary, and the polytope is multi-dimensional, but is of finite volume and convex.

Figure 3A:
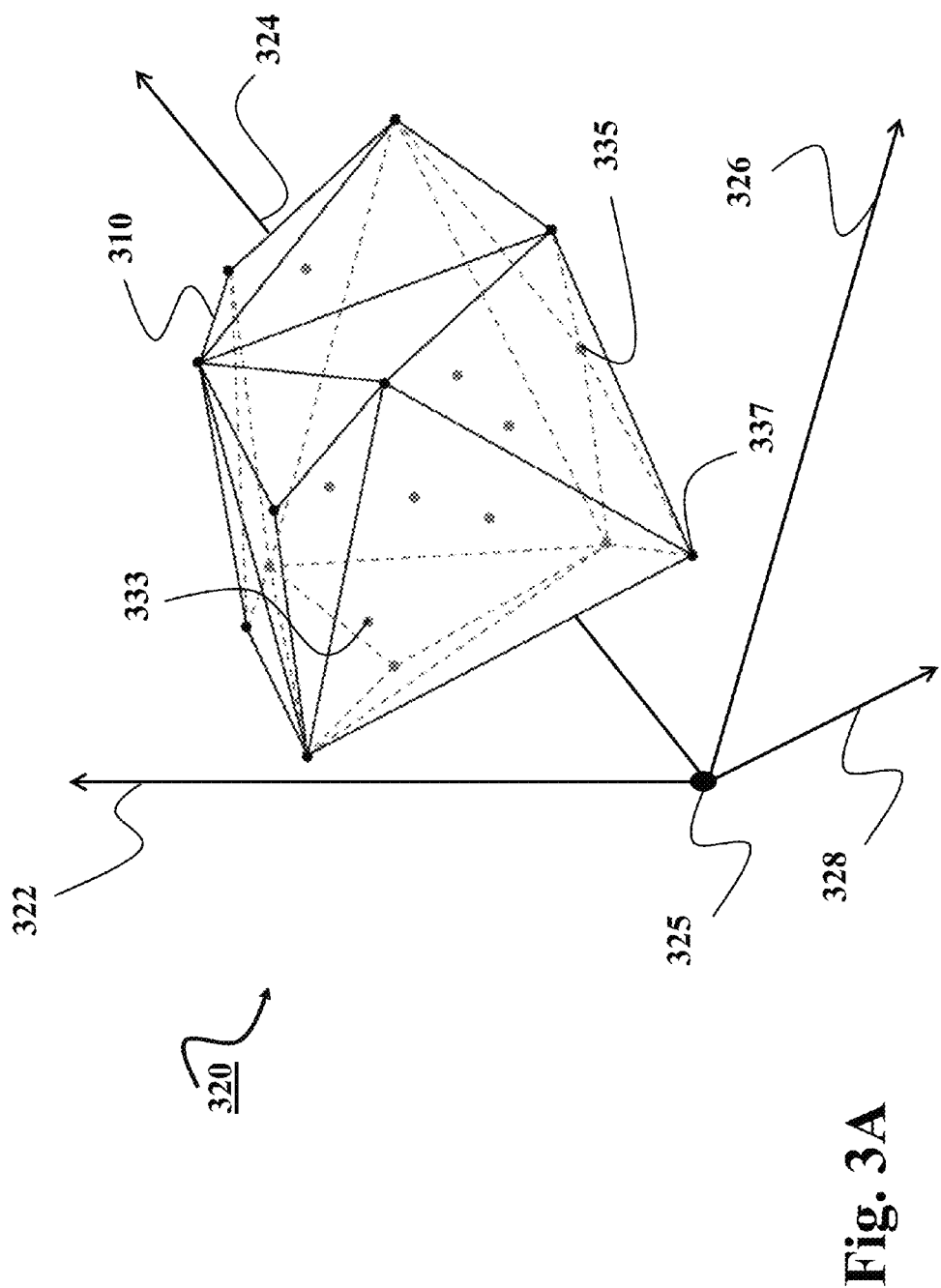
FIG. 3A is a schematic of an exemplar polytope arranged in the coordinate system visualizing the principles of some embodiments of the invention.

FIG. 3A shows an exemplar polytope 310 arranged in a coordinate system 320 visualizing the principles of the above realization. The coordinate system 320 is usually a low-dimensional system of parameters of the model having the uncertainties. For example, if the model includes four parameters with uncertainties, the coordinate system 320 is four dimensional and have one dimension 322, 324, 326, and 328 for each of the parameters such that new values of the combination of parameters, e.g., values 333, 335, 337 are selected within the polytope 310.

Figure 3B:
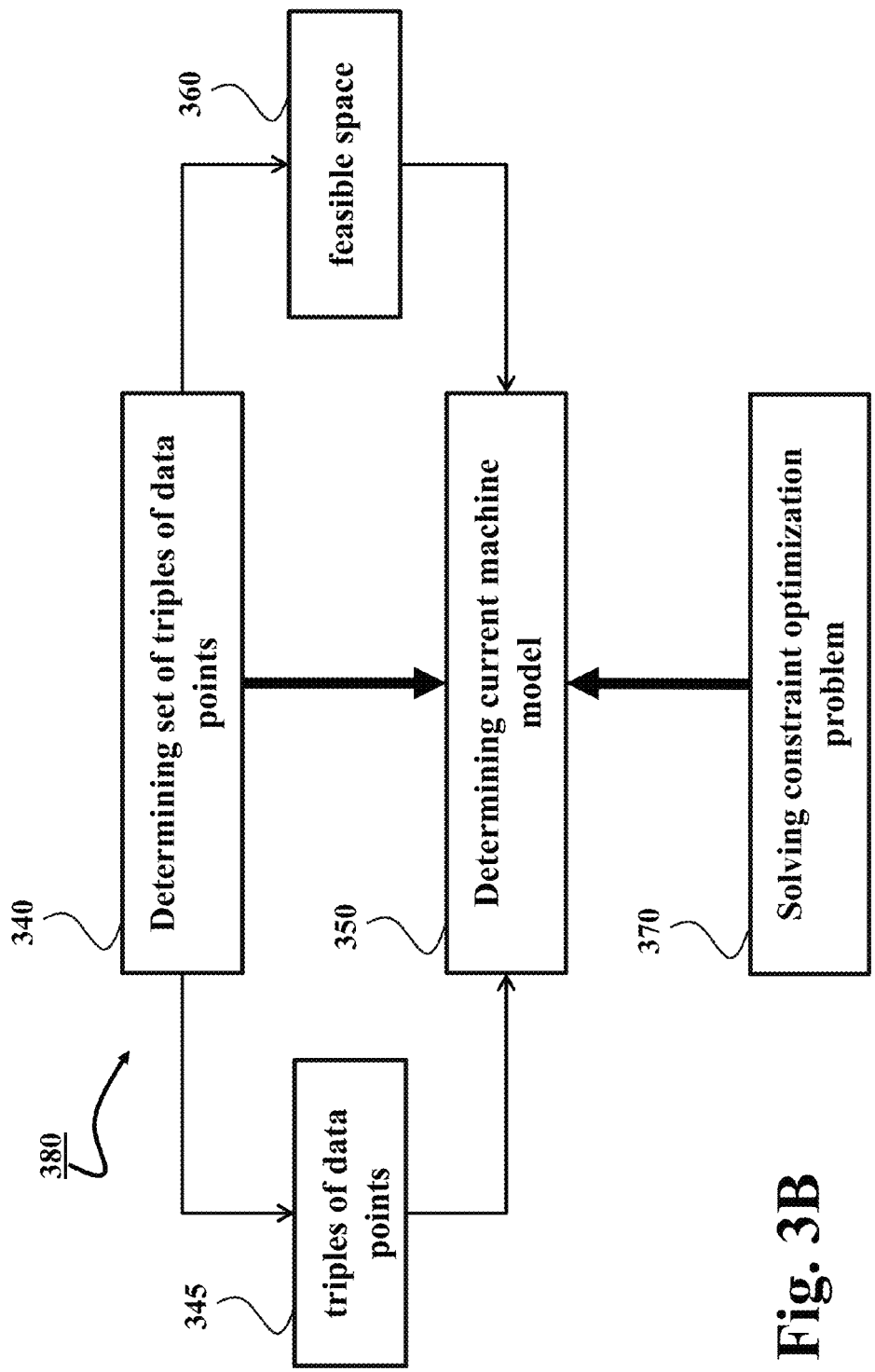
FIG. 3B is a schematic of effect of the uncertainties of the parameters of the model on a state of the machine.

FIG. 3B shows a block diagram of a model identification method 380 of one embodiment for updating the model of the machine while controlling an operation of the machine according to the model with uncertainties. The method determines 340 a set of triples of data points 345 representing the operation of the system over a period of time. For example, the method determines the set of triples of data points while controlling the machine iteratively over a set of control steps and storing the triple of data points after each control step to update the set of triples of data points.

The method also determines 350 a current model of the system based on the set of triples of data points 345, such that the current model is within a feasible space 360 of models of the system corresponding to a polytope with vertices defined by base models representing extreme values of different parameters of the model. For example, the method can determine the feasible space of models of the machine using a nominal model 202 of the machine and an uncertainty model 203 of the machine.

In some embodiment the method uses entire set of the triples of data points 345 or multiple triples of data points selected from the set 345 to determine the current model of the system. This approach increase certainty in the determined values of the parameters of the model. For example, one embodiment of the invention determines 350 the current model by solving 370 a constrained optimization problem minimizing an error between a measured set of triples of data points and an estimated set of triples of data points estimated using the current model.

A large number of parameters of the machine can vary resulting in multi-dimensional polytope of the feasible space. Thus, it can be difficult to define the constraints for the polytope of such a complexity. It can also be difficult to solve the constrained optimization problem subject to a multitude of the constraints.

Some embodiments of the invention are based on another realization that because the polytope of the feasible space is convex, the current model can be defined in barycentric coordinates on the polytope. The barycentric coordinate system is a coordinate system in which the location of a point of a shape is specified as the center of mass, or barycenter, of masses placed at the vertices of the shape. Coordinates that extend outside the shape are negative. Knowing the values of the barycentric coordinates and the values of the vertices in any non-barycentric coordinate system, it is possible to determine the value of the point in the non-barycentric coordinate system.

When the current model is identified in the barycentric coordinates on the polytope, some embodiments specify barycentric constraints ensuring that the current model is within the polytope. Specifically, the barycentric constraints include a constraint that all barycentric coordinates of the current model are non-negative to ensure that the current model is within the polytope and a constraint that a sum of all barycentric coordinates of the current model equals one. Thus, the constrained optimization can be simplified using the barycentric coordinate system.

For example, one embodiment of the invention represents the uncertainty range of the parameters of the model using a differential inclusion that allows the dynamics to be deterministic, but represented by one member of an entire set of possible functions. In discrete time and for linear time invariant (LTI) systems, a polytopic linear difference inclusion (pLDI) can compactly represent that set by a polytope with n vertices $(A_i, B_i)$, $1 \leq i \leq n$, such that the true model of the machine $$x(t+1)=Ax(t)+Bu(t)$$

is described by matrices A and B that satisfy the property $$A=\Sigma_{i=1}^n \lambda_i A_i,$$

$$B=\Sigma_{i=1}^n \lambda_i B_i, \lambda_i \geq 0,$$

$$\Sigma_{i=1}^n \lambda_i=1,$$

That is, if $co(A_i, B_i)$ is the convex hull of the vertices $(A_i, B_i)$, the true system model (A, B) always lies within that convex hull.

When some disturbance w(t) acts upon the system, such that $$x(t+1)=Ax(t)+Bu(t)+w(t),$$

the disturbance w(t) belongs to another polytope W described by a set of vertices $w_i$, such that $W \subseteq co(w_i)$. The resulting representation is a disturbed polytopic linear difference inclusion (dpLDI). Some embodiments of the invention use a model identification method that identifies the current model in the form of a dpLDI from a collected data set.

For example, the model identification method can determine estimates $\hat{A}$ and $\hat{B}$ of the expected values of the parameters of an LTI. Let μ represent the vector of estimates of the entries in these two matrices $\hat{A}$ and $\hat{B}$, stacked together. Let also $v_i$ represent the entries in the base matrices $A_i$ and $B_i$. Then, any convex combination $$\Lambda=[\lambda_1, \lambda_1, \ldots, \lambda_n],$$

$$\lambda_i \geq 0, \Sigma_{i=1}^n \lambda_i=1,$$

such that $\mu=\Sigma_{i=1}^n \lambda_i v_i$, satisfies $$\hat{A}=\Sigma_{i=1}^n \lambda_i A_i, \hat{B}=\Sigma_{i=1}^n \lambda_i B_i,$$

and hence can be used to express the identified system ($\hat{A}$, $\hat{B}$) in terms of the base systems $(A_i, B_i)$. However, there is no guarantee that the identified parameter vector μ belongs to the polytope. When the identified parameter vector μ is outside of the polytope does not, at least one of the values of $\lambda_i$ is negative.

Figure 4A:
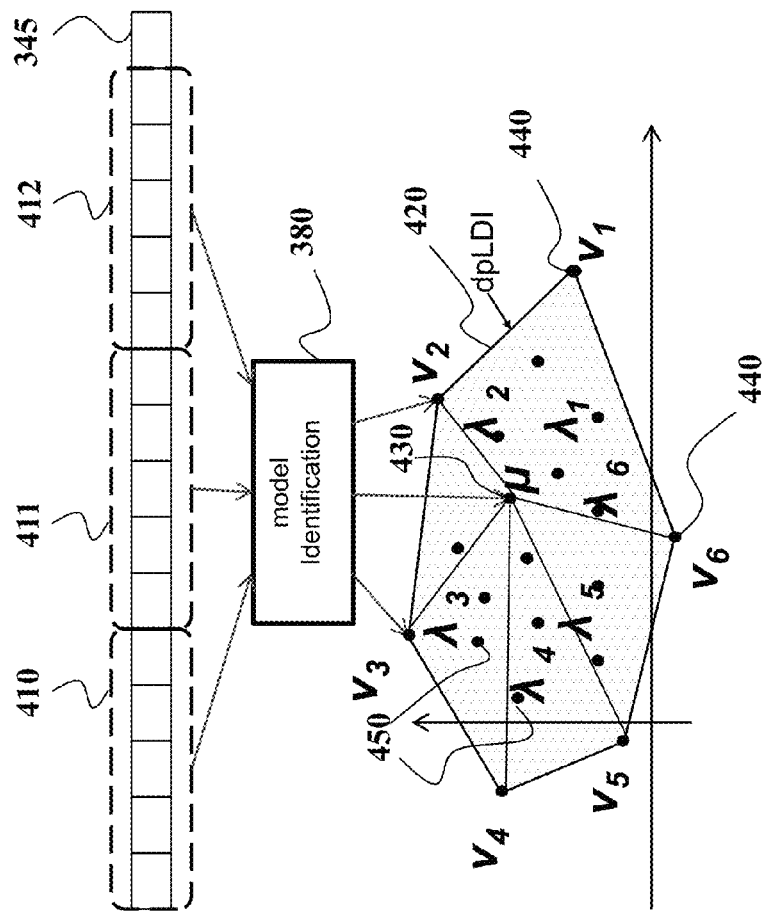
FIGS. 4A and 4B show a schematic and a block diagram of a method for performing the model identification using the barycentric coordinates according to some embodiments of the invention.
Figure 4B:
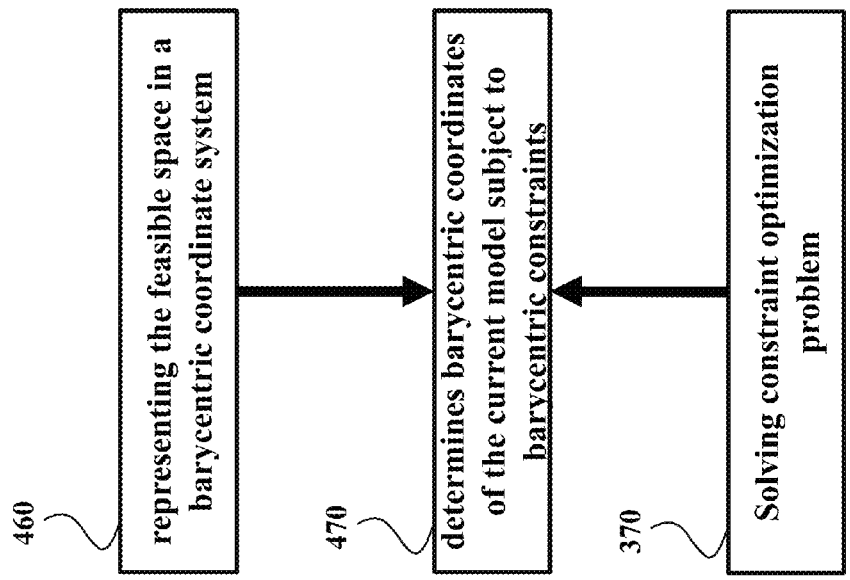

FIGS. 4A and 4B show a schematic and a block diagram of a method for performing the model identification 380 using the barycentric coordinate and constraints on the barycentric coordinate. The method represents 460 the feasible space for the parameters of the model defined by vertices 440 of the polytope in a barycentric coordinate system 420. For example, the system 420 can be the dpLDI representation.

The method determines 470 the barycentric coordinates 430 of the current model subject to barycentric constraints enforcing that the barycentric coordinates of the current model are non-negative and a sum of the barycentric coordinates of the current model equals to one. In this example, parameter vector μ 430 of the model of the machine has barycentric coordinates $\lambda_1, \lambda_2, \lambda_3, \lambda_4, \lambda_5, \lambda_6$. For example, n elements of the parameter vector μ of the model are subject to the barycentric constraints $\lambda_i \geq 0$, $\Sigma_{i=1}^n \lambda_i=1$, for $1 \leq i \leq n$, wherein $\Lambda=[\lambda_1, \lambda_1, \ldots, \lambda_n]$, is the convex combination of parameters of the model.

The model identification 380 selects the combination of parameters 430 from other combinations 450 satisfying the barycentric constraints using the optimization 370. In this example, the model identification 380 selects subsets 410-412 of triples of the data points 345 for different iterations of the optimization 370.

Least-Squares Estimate of the Convex Combination A

One embodiment invention solves constrained optimization problem 370 to guarantee that combination of parameters of the model Λ is always a convex combination by enforcing the constraints $\lambda_i \geq 0, \Sigma_{i=1}^n \lambda_i=1$, for $1 \leq n$, during the process of estimation of the parameter models μt. To this end, the embodiment formulates the model identification method as a constrained quadratic optimization, as follows.

Let x(t) and u(t), $0 \leq t \leq T$, be the observed state and control histories until time T. Then, for any time $w \leq t \leq T$, where w is the length of a time-lagged window of suitable size, we try to minimize the discrepancy $\xi_j$ between the actually observed value x(t−w+j) of the j-th component of the time-lagged window and its predicted value $\Sigma_{i=1}^n \lambda_i(t)\hat{x}_i(t-w+j)$ through the convex combination $\lambda_i(t)$ and the individual predictions $\hat{x}_i(t-j)$ of each of the n base dynamical systems $(A_i, B_i)$:

$$\min_{\lambda_i(j)} \sum_{j=1}^w \xi_j^T P \xi_j + \Delta_{\lambda_i}^T Q \Delta_{\lambda_i} \quad (1)$$

$$\xi_j = \sum_{i=1}^n \lambda_i(t)\hat{x}_i(t-w+j) - x(t-w+j),$$

$$\Delta_{\lambda_i} = \lambda_i(t) - \lambda_i(t-1)$$

$$\sum_{i=1}^n \lambda_i(t) = 1,$$

$$0 \leq \lambda_i(t) \leq 1,$$

where for $$t = w, \ldots, T,$$

$$j = 1, \ldots, w,$$

$$\hat{x}_i(t-w+j) = \lambda_i(t)A_i x_i(t-w+j-1) + B_i u(t-w+j-1).$$

One embodiment applies the constrained quadratic method in a moving-horizon scheme, where estimates $\lambda_i(t)$ are determined as soon as new measurements x(t) and u(t) become available. Consistency of estimates is encouraged by reducing the discrepancy $\Delta_{\lambda_i} = \lambda_i(t) - \lambda_i(t-1)$ between consecutive estimates of the parameters of the model. For example, the consistency of the estimates can be encouraged through a weighting matrix Q, starting from some initial guess $\lambda_i(0)$, or not enforcing this consistency constraint for the first execution, at t=w.

When Q is the identity matrix, this is equivalent to minimizing the $l_2$ norm of the difference between consecutive estimates. Similarly, when P in Equation (1) is the identity matrix, the formulation is equivalent to constrained least-squares estimation. Implicitly, this corresponds to the assumption of independent and identically normally distributed random noise in the measurements of the states and controls of the machine with the added benefit of enforcing the convex combination constraint on all estimates $\lambda_i(t)$. Because the estimates of the convex combination $\Lambda$ are time-varying, the corresponding estimates of the identified model parameters $\mu$ also vary accordingly: $\mu(t) = \Sigma_{i=1}^n \lambda_i(t) v_i$.

Generalized Barycentric Coordinates for Regularization of $\Lambda$

Even though the constrained least squares method described above can obtain a series of estimates $\lambda_i(t)$ that are also consistent among themselves across time, there is still one possible problem related to the uniqueness of its solution and its sensitivity to small variations in the measured data. This problem stems from the fact that depending on the dimensionality d of the vectors $v_i$, and its relationship to the number of such vectors n, the convex combination $\Lambda = [\lambda_1, \lambda_1, \ldots, \lambda_n]$ that satisfies the conditions $\lambda_i \geq 0$, $\Sigma_{i=1}^n \lambda_i = 1$ might not be unique. When n=d+1, and the vectors $v_i$ are linearly independent, the convex combination $\Lambda$ is known to be unique, and identical to the barycentric coordinates of $\mu$ with respect to $v_i$. However, when n>d+1, an infinite number of such combinations exist. Selecting one of them at random is not a satisfying solution, because the mapping from identified systems to convex combinations would not be smooth, that is, if the combination $\Lambda$ is selected for an estimated vector $\mu$, a very different value $\Lambda_1$ can be selected for a slightly perturbed estimated vector $\mu + \epsilon$.

The regularization constraint minimizing $\Delta_{\lambda_i} = \lambda_i(t) - \lambda_i(t-1)$ across time provides a form of regularization of the estimates relative to one another, but if the initial estimate $\lambda_i(0)$ is changed, or omitted, and the measurements are slightly perturbed, the entire history of estimates $\lambda_i(t)$ is likely to be very different. This needs to be avoided especially when using the estimation to obtain a prediction model for control, because it would cause different models to be obtained in almost identical situations. This is potentially a problem because the model affects the decisions of the control system on the control inputs, and since the input determines the operation of the machine, the machine behaves inconsistently, that is, very differently in almost identical situations.

Thus, some embodiments of the invention provide a method for selecting a convex combination $\Lambda$ for a given data set of measurements that is smooth and not sensitive to small variations in the measured data. Those embodiments are based on an observation that the estimate $\mu(t)$ is less sensitive to the noise than the convex combination $\Lambda(t)$ regardless of the type of the model identification method.

Accordingly, some embodiments provide a method for mapping the system estimates $\mu(t)$ to convex combinations $\Lambda(t)$, such that the mapping is smooth, i.e., small perturbations in measured data result in small perturbations in $\Lambda$. This method represents a point $\mu$ in a d-dimensional space as a convex combination $\Sigma_{i=1}^n \lambda_i v_i$ of n points $v_i$, where n>d+1, such that small perturbations in $\mu$ result in correspondingly small perturbations in the values $\lambda_i$.

One class of representations that provide such unique and smooth mappings are generalized barycentric coordinates (GBC). The properties of the various sets of generalized barycentric coordinates provide the Langrangian property $\lambda_i(v_j) = \delta_{ij}$, as well as continuous and smooth derivatives $\partial \lambda_i / \partial \mu_j$ of the coordinates in $\Lambda$ with respect to the represented point $\mu$. However, such properties are limited to the cases of relatively small dimensions of the polytope, i.e., when d=2 or d=3.

Figure 9:
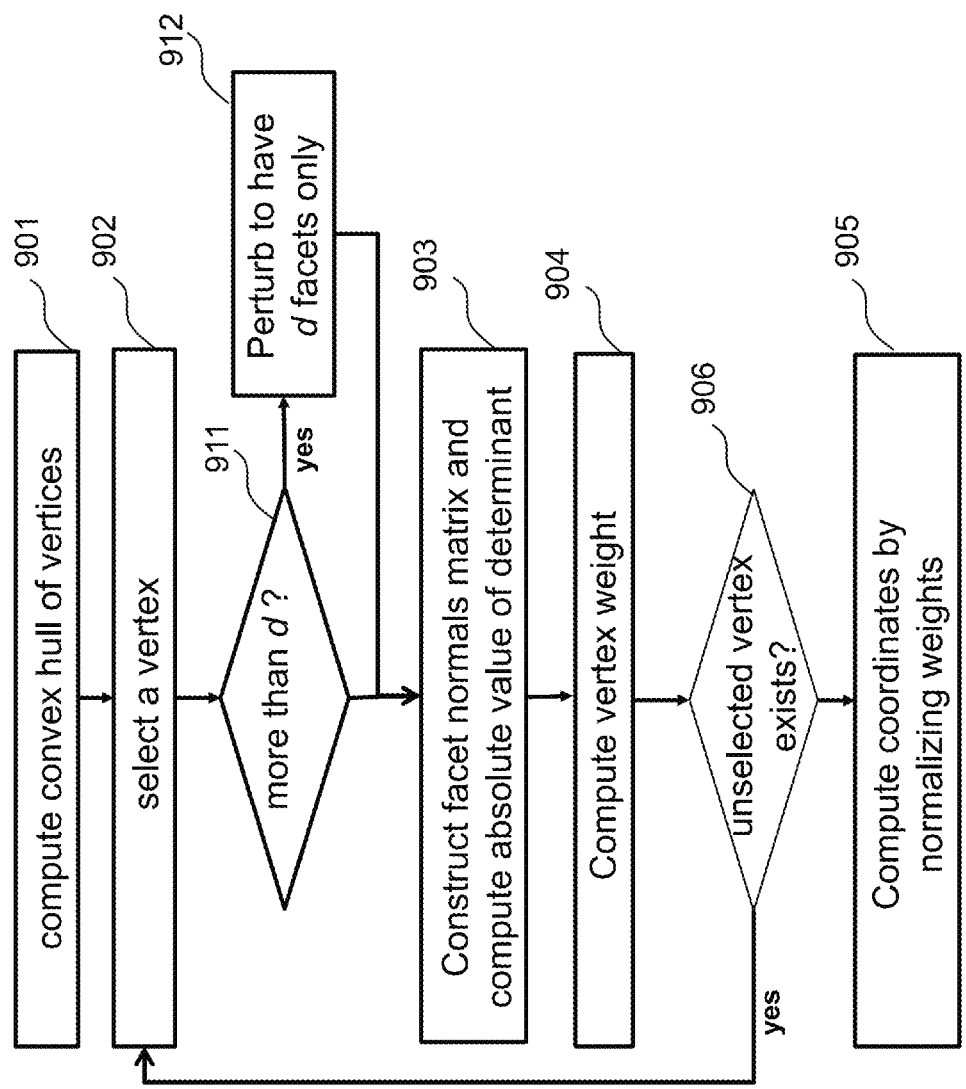
FIG. 9 is a block diagram of a mapping method for determining generalized barycentric coordinates according to one embodiment of the invention

FIG. 9 shows a block diagram of a mapping method for determining generalized barycentric coordinates for a particular point $\mu$ with respect to the dpLDI defined by the set of n vertices $v_i$, $1 \leq i \leq n$ in d-dimensional Euclidean space according to one embodiment of the invention. This embodiment addresses the need of dealing with high dimensional spaces. The method includes the following 1. Compute 901 the convex hull of the n vertices $v_i$. The convex hull includes a number of facets represented by d−1-dimensional hyperplanes.
2. For every 902 vertex $v_i$, identify the set of facets $F_i$ incident to it. In the general case, there are d such facets. Let $n_j$, $1 \leq j \leq d$ represent the facet normal of the j-th such facet.
3. Place 903 all facet normals into the matrix $K_i$, such that $n_j$ is in its j-th row, and compute the coefficient $\kappa_i = |Det(K_i)|$, i.e., the absolute value of the determinant of the matrix $K_i$.
4. Compute 904 the weight coefficient $W_i = \kappa_i / \Pi_{j \in F_i}(n_j \cdot (v_i - \mu))$.
5. When 906 all vertices have been selected, compute 905 the set of GBC $\Lambda^{30} = [\lambda_1^+, \lambda_1^+, \ldots, \lambda_n^+]$ by normalization of the weights $W_i$, that is, $\lambda_i^+ = W_i / \Sigma_{i=1}^n W_i$.

In some cases 911, the set of facets $F_i$ incident to vertex $v_i$ can include more than d members. In such cases, the facets in $F_i$ are perturbed 912 infinitesimally so that the vertex is decomposed into several vertices with only d facets incident to each of them, after which the weight coefficient $W_i$ for the original vertex $v_i$ is computed as the sum of the weight coefficients for the perturbed vertices. Following this mapping method, an identified point $\mu$ is always mapped to the same vector of generalized barycentric coordinates $\Lambda^+$, thus uniquely representing $\mu$ with respect to the given dpLDI.

Bootstrap Estimation of Probability Distributions Over Identified Model

The current model identified by various embodiments can be seen as a convex combination of a set of pre-defined base models. It is often the case, however, that the determination of the current model includes disturbance, i.e., uncertainties in the parameters of the model. Accordingly, some embodiments of the invention determine a probability distribution over such convex combinations. However, if the uncertainties in the parameters are quantified to be random with multivariate normal distributions, the disturbance become unbounded and the possible models of the machine can be outside of the feasible space of the polytope.

For example, a single application of the least-squares estimation of the model $\mu$ followed by the described regularization by means of GBC results in a particular estimate $\Lambda^+$. However, when the observed data from which $\mu$, and from there $\Lambda^+$ has been derived, include noise, the variable $\Lambda^+$ is not deterministic, but a stochastic (random) variable.

Accordingly, some embodiments of the invention determine the probability distribution over the parameters of the current model to know the possible variability of this estimate $\Lambda^+$. When variability is high, the resulting optimizing control trajectories are conservative, typically sacrificing performance in order to ensure satisfaction of constraints. Conversely, when variability is low, and the controlled system is almost deterministic, the optimizing control trajectories are more aggressive, maximizing performance with the knowledge that constraint satisfaction is guaranteed.

Accordingly, some embodiments provide a method for deriving a measure of variability for $\Lambda^+$, or an entire probability distribution for the variability over its natural support set, i.e., barycentric coordinates over the dpLDI. Just like the dpLDI, this support set is bounded, and satisfies the requirements of boundedness by robust MPC methods.

Some embodiments of the invention determine the probability distribution over the parameters of the current model using an empirical density function over possible models determined using different subsets of the measurement data, following the bootstrap method with replacement. For example, a bootstrap method from statistics provides a principled approach to deriving variability measures for a statistical estimator. The method includes continuously re-sampling the original data sample with replacement, applying each time the computational procedure for the estimator. In this case, this corresponds to selecting different subsets of the data points $x(t)$, $0 \leq t \leq T$. However, a time series generated by a dynamical system is not an unordered set, but an ordered sequence, and omitting some of the data points $x(t)$ result in incorrect system identification.

Accordingly, some embodiments instead of sampling the data points themselves, vary the error terms $\xi_j = \sum_{i=1}^{n} \lambda_i(t) \hat{x}_i (t-w+j) - x(t-w+j)$ over which model fit is determined. For example, one embodiment, within a current window of w observations, continuously re-samples the indices j, $1 \leq j \leq w$, for which error terms is included in the objective function in Equation 1.

By repeating this procedure M, the embodiment determines M different estimates $\Lambda_m^+$, $1 \leq m \leq M$. Next, the embodiment determines the variability of $\Lambda+$ either as the sample variance $\sigma_\Lambda = \sqrt{\sum_{m=1}^{M} (\Lambda_m^+ - \Lambda^+)^2 / (M-1)}$, or uses the entire set $\{\Lambda_m^+\}$ as an empirical estimate of the distribution. For example, scenario-based robust model predictive control methods can directly generate scenarios from individual estimates $\Lambda_m^+$.

Constraints on Control Inputs to the Machine

Some embodiments of the invention are based on realization that in order to guarantee that the constraints on the machine motion are satisfied during the operation of the machine for all variation of the values of the parameters of the model within the predetermined range, a subset of the feasible region $\mathcal{X}$ of the states can be determined, such that whenever the state of the machine is in such a subset, there exists at least one admissible control input such that the state remains in the subset for all possible values of the parameters and the disturbances. By remaining in the subset, all the machine motion constraints are satisfied since the subset is included in the feasible region $\mathcal{X}$.

Some embodiments of the invention determine and use such constraints on the control inputs, referred herein as control-invariant constraints on the control inputs, to determine a control input that maintains the state of the machine in such a subset of the feasible region $\mathcal{X}$ of the states, referred herein as a control-invariant subset of states. By the construction, a control input satisfying the control-invariant constraints maintains a state of the machine in a control-invariant subset of states satisfying constraints on the operation of the machine for all values of the parameter of the model within the range defined by the uncertainty model.

Figure 5A:
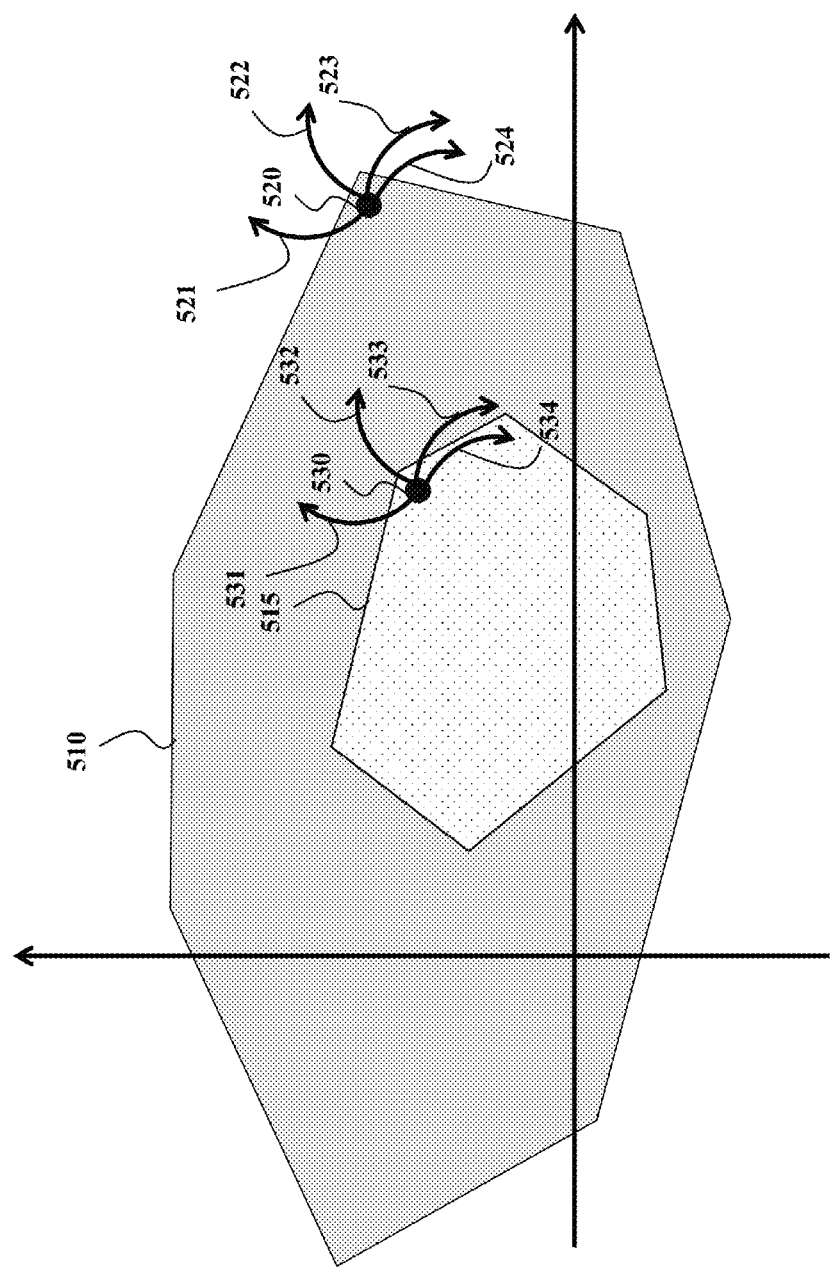
FIG. 5A is a schematic of an example of a two-dimensional projection of the control-invariant subset of states defined by various constraints on the operation of the machine according to some embodiments of the invention.

FIG. 5A shows an example of a two-dimensional projection of the control-invariant subset of states 510 defined by various constraints on the operation of the machine according to embodiments of the invention. Typically, the feasible region is a multi-dimensional polytope determined by hyperplanes, which are represented by linear inequalities, along multiple dimensions corresponding to the constraints on the operation.

Due to the nature of receding horizon control, the existence of a solution for a certain horizon does not by itself guarantees the existence of the solution for a subsequent horizon. For example, the state of the machine and a state of the reference trajectory 520 can be optimal and feasible for one iteration, but all control actions 521-524 that controller is allowed to take during the next iteration can bring a state of the machine outside of the feasible region 510.

Some embodiments of the invention are based on yet another realization that it is possible to select a control-invariant subset 515 of the feasible region, such that from any state of the machine within that control-invariant subset, there is a control input maintaining the state of the machine within the subset for the known future states of the reference trajectory or for all admissible future states of the reference trajectory. For example, for any state such as a state 530 within the subset 515 and within all possible control inputs 531-534 that the controller can execute, there is at least one control input 534 that maintains the state of the machine and reference within the subset 515. In this case, the subset 515 is a control invariant subset.

Some embodiments determine the control invariant subset of state for the model of Equation (4), such that for each state within the control invariant subset there is at least one control action maintaining the state of the machine within the control invariant subset for all possible states values according to Equation (5).

FIG. 5B shows the relation between the feasible region 501 of the states of the machine, the largest robust control invariant subset 502 of the state for the model with uncertainties within $\mathcal{X}$. In some embodiments the control invariant subset 502 is reduced to form control invariant 503, which is less than the subset 502, but has a simpler shape formed by linear equations. Because the subset 502 is determined by nonlinear equations, the shape of the subset 502 can be non-convex. Thus, computation of 503 is simpler, more efficient and advantageous for control purposes.

Figure 6:
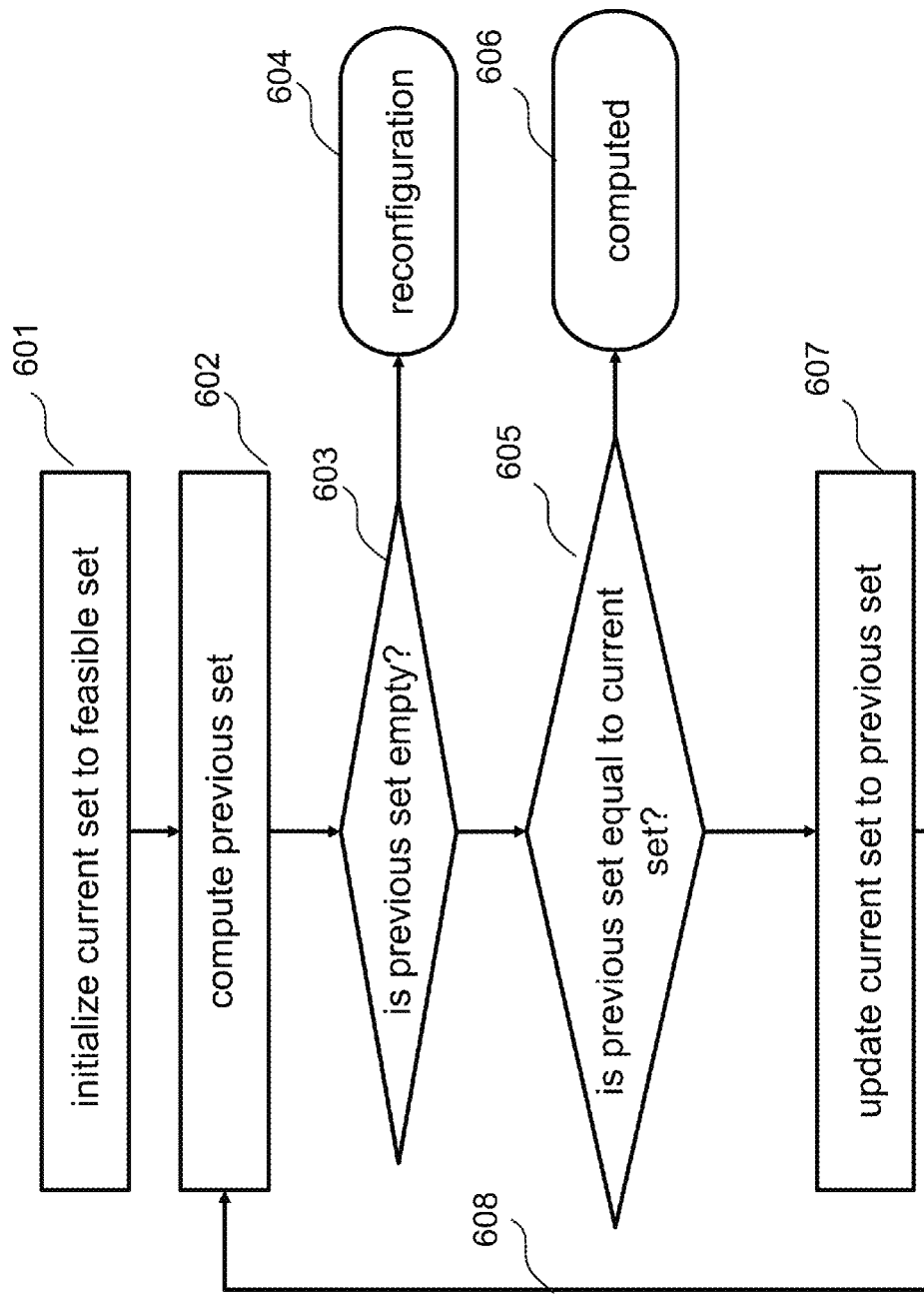
FIG. 6 is a block diagram of a backward-reachable region computation for determining the control invariant subset according to one embodiment of the invention.

FIG. 6 shows a block diagram of a backward-reachable region computation for determining the robust control invariant subset 503 starting from the feasible region $\mathcal{X}$, 501 according to one embodiment of the invention. The backward-reachable region computation determines the robust control invariant subset $\mathcal{C}_x$ and also the control invariant set $\mathcal{C}_u(x)$, which determines for any x within $\mathcal{C}_x$ the set of inputs u in $\mathcal{U}$ that can be applied so that all possible next states are inside $\mathcal{C}_x$.

The backward-reachable region computation initializes 601 a current set $\mathcal{X}c$ to the feasible set $\mathcal{X}$ and determines 602 a previous set of states $\mathcal{X}_p$ as a subset of the current set $\mathcal{X}_c$ such that for all states x in $\mathcal{X}_p$ there exists an input u in $\mathcal{U}$ such that for all the possible values of the parameters p in P, the updated state is in the current set $\mathcal{X}_c$.

If 603 the previous set $\mathcal{X}_p$ is empty 604, correct operation of the controller cannot be guaranteed, which means that the set P of possible values of the parameters should be reduced in size, possibly by changing the design or objective of the operation of the machine. If 605 the current set and the previous set are equal, that is also 606 the set $\mathcal{C}_x$ otherwise, the previous set is assigned 607 to be the current set and the computation iterates 608 again. When the set $\mathcal{C}_x$ is found the last computed set of state-input couples is the robust admissible input set $\mathcal{C}_u(x)$ for all x within $\mathcal{C}_x$.

Figure 7:
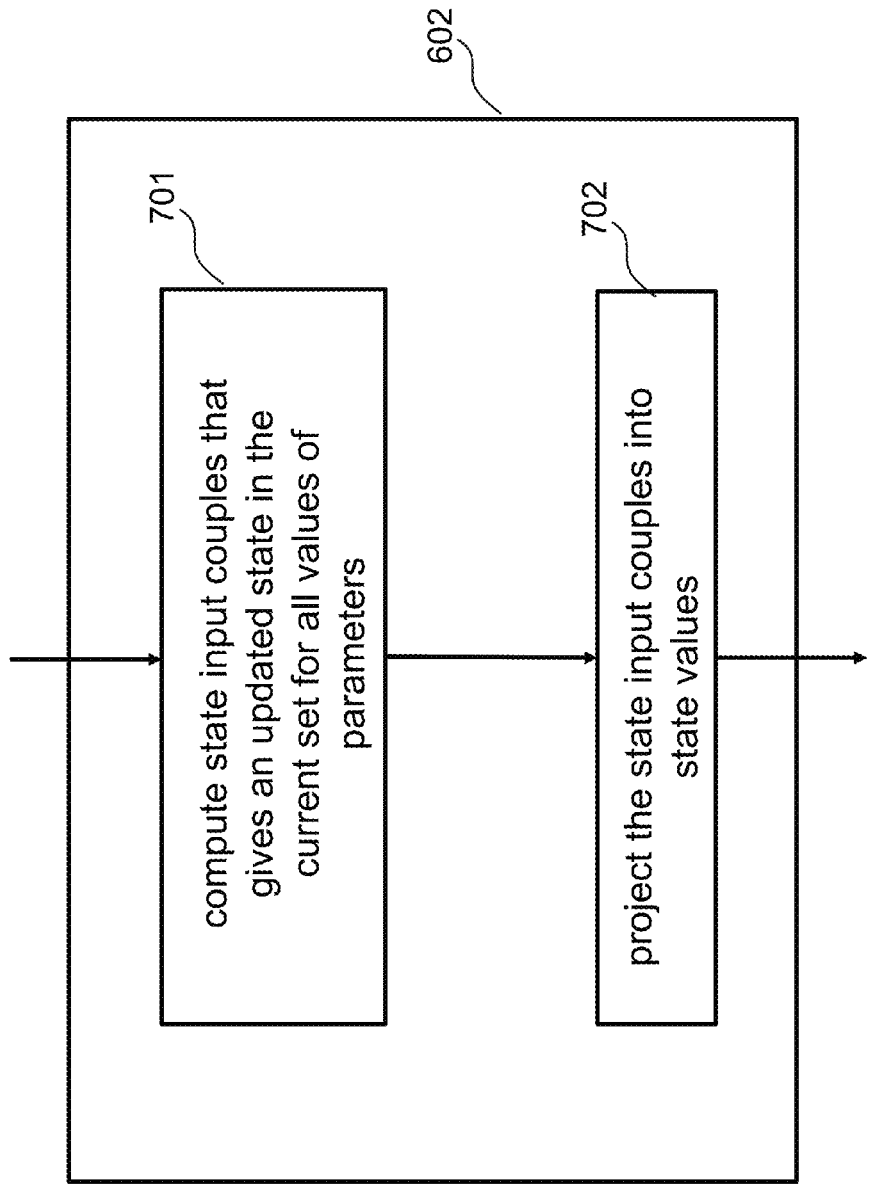
FIG. 7 is a block diagram of an exemplar implementation of determining the previous set of states according to one embodiment of the invention.

FIG. 7 shows a block diagram of an exemplar implementation of determining 602 the previous set of states according to one embodiment. The embodiment identifies 701 the state-input couple that generates an updated state that is in the current set for all the values of the parameters, and projects 702 the state input couples into state values, i.e., the embodiment identifies the states that belongs to at least one of such state-input couples.

Figure 8:
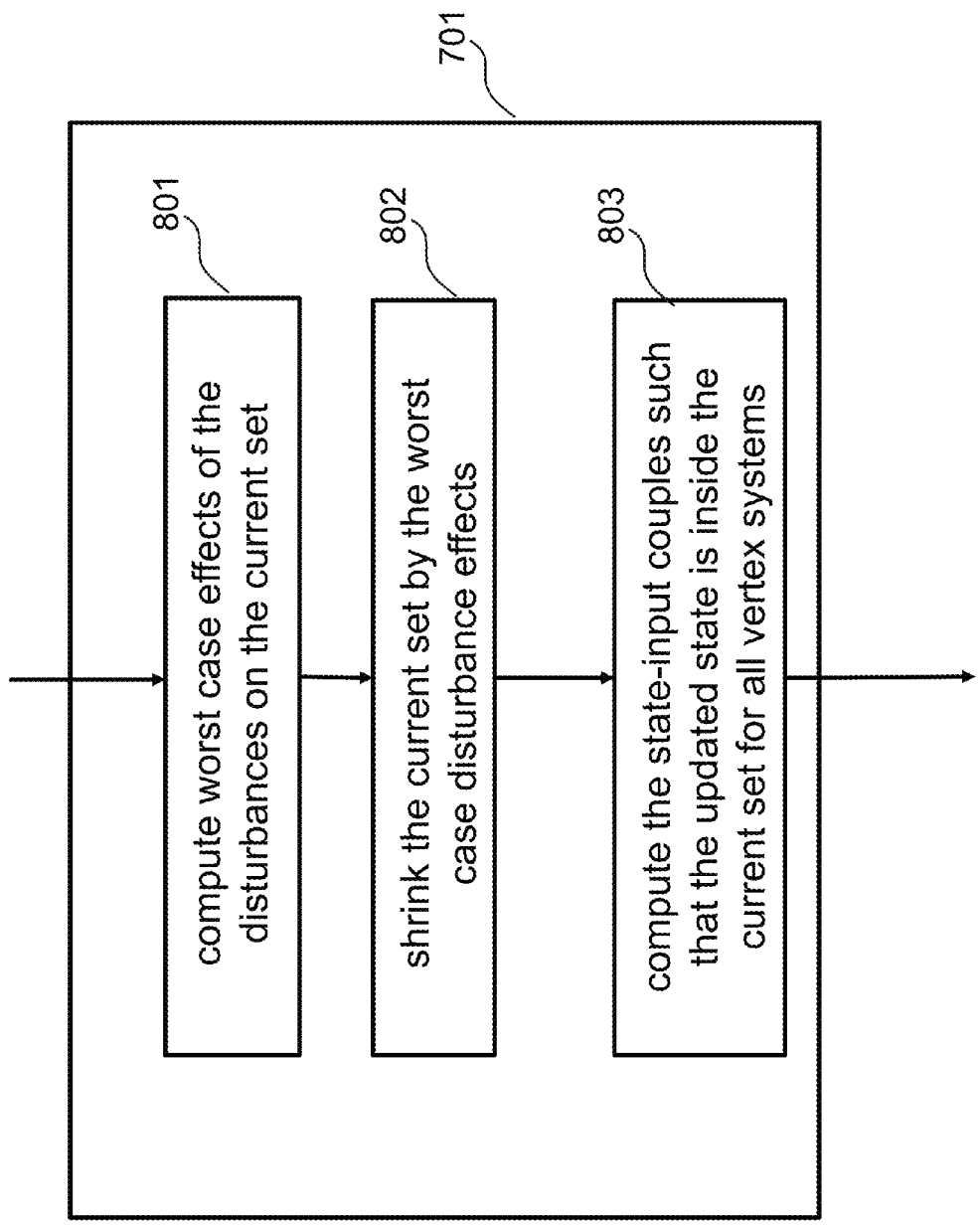
FIG. 8 is a block diagram of a method for determining the couples of states-inputs according to one embodiment of the invention.

FIG. 8 shows a block diagram of a method for computation of the couples of states-inputs 701 when linear inequalities describe the sets $\mathcal{X}$ and $\mathcal{U}$. The method considers the current set as $$H^{(c)}x \leq K^{(c)}$$

and determines 801 the worst case effects of the additive disturbance iv on the current set, $$[S]_i = \max_{w \in W} [H(c)B_w w]_i,$$
$$i = 1, \ldots, n_q^{(c)}$$

wherein $H^{(c)}$ is a matrix describing the current set, $n_q^{(c)}$ is the number of rows of the matrix $H^{(c)}$ of the current set.

Next, the method reduces 802 the current set by the worst case disturbance effects to produce a reduced current set $\mathcal{X}_s$ described by $$H^{(c)}x \leq K^{(c)} - S_i,$$

and then determines 803 the couples (x, u) such that the updated state is inside the current set for all the vertexes, i.e., $A_i x + B_i u \in \mathcal{X}_s, \forall_s = 1, \ldots 1$.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling an operation of a machine according to a model of the machine having uncertainties, wherein the method uses a processor coupled with stored instructions implementing the method, wherein the instructions, when executed by the processor carry out at least some steps of the method, comprising:
   determining a set of triples of data points representing the operation of the machine over a period of time, wherein a triple of data points in the set includes two subsequent states of the machine and corresponding control input causing a transition of the machine between the subsequent states;
   determining a current model of the machine based on the set of triples of data points, such that the current model is within a feasible space of models of the machine corresponding to a polytope with vertices defined by base models representing extreme values of different parameters of the model, wherein determining the current model includes:
      representing the feasible space in a generalized barycentric coordinate system on the polytope;
      determining generalized barycentric coordinates of the current model subject to barycentric constraints enforcing that the generalized barycentric coordinates of the current model are non-negative and a sum of the generalized barycentric coordinates of the current model equals to one; and
      determining the current model using the generalized barycentric coordinates and the base models; and
   controlling the operation of the machine using the current model.

2. The method of claim 1, wherein the determining the set of triples of data points comprises:
   controlling the machine iteratively over a set of control steps; and
   storing the triple of data points after each control step to update the set of triples of data points.

3. The method of claim 1, further comprising:
   determining the feasible space of models of the machine using a nominal model of the machine and an uncertainty model of the machine.

4. The method of claim 1, wherein the determining the current model comprises:
   solving a constrained optimization problem minimizing an error between the set of triples of data points and an estimated set of triples of data points estimated using the current model.

5. The method of claim 1, wherein the determining generalized barycentric coordinates comprises:

solving a constrained optimization problem minimizing an error between the set of triples of data points and an estimated set of triples of data points estimated using the current model.

6. The method of claim 5, wherein the solving comprises: determining a convex combination of parameters of the model using a constrained quadratic optimization of n parameters of the model $\mu$ satisfying constraints $\lambda_i \geq 0$, $\Sigma_{i=1}^n \lambda_i = 1$, for $1 \leq i \leq n$, wherein $\Lambda = [\lambda_1, \lambda_2, \ldots, \lambda_n]$, is the convex combination of parameters of the model.

7. The method of claim 6, wherein the constrained quadratic optimization reduces a discrepancy $\Delta_{\lambda_i} = \lambda_i(t) - \lambda_i(t-1)$ between consecutive estimates of the parameters of the model.

8. The method of claim 1, further comprising:
determining multiple subsets of triples of data points;
determining a sample model of the machine for each subsets of triples of data points to produce a set of sample models, wherein each sample model is within the feasible space; and
determining a probability distribution over the current model using the set of sample models.

9. The method of claim 8, wherein the multiple subsets of triples of data points are determined using a bootstrap method with replacement.

10. The method of claim 1, further comprising:
controlling the machine iteratively over a set of control steps using control inputs satisfying control-invariant constraints on the control inputs selected such that any value of a control input satisfying the control-invariant constraints maintains a state of the machine in a control-invariant subset of states satisfying constraints on the operation of the machine, wherein for any state of the machine within the control-invariant subset there is an admissible control input satisfying the control-invariant constraints and maintaining the state of the machine within the control-invariant set.

11. A method for controlling an operation of a machine according to a model of the machine having uncertainties, wherein the method uses a processor coupled with stored instructions implementing the method, wherein the instructions, when executed by the processor carry out at least some steps of the method, comprising:
controlling the machine iteratively over a set of control steps;
storing, at each control step, a triple of data points to form a set of triples of data points, wherein the data points in the triple define two subsequent states of the machine and corresponding control input causing a transition of the machine between the subsequent states; and
determining a current model of the machine based on the set of triples of data points, such that the current model is within a feasible space of models of the machine corresponding to a polytope with vertices defined by base models representing extreme values of different parameters of the model, wherein determining the current model includes:
representing the feasible space in a generalized barycentric coordinate system on the polytope;
determining generalized barycentric coordinates of the current model subject to barycentric constraints enforcing that the generalized barycentric coordinates of the current model are non-negative and a sum of the generalized barycentric coordinates of the current model equals to one; and
determining the current model using the generalized barycentric coordinates and the base models; and
controlling the operation of the machine using the current model.

12. The method of claim 11, wherein the determining generalized barycentric coordinates comprises:
solving a constrained optimization problem minimizing an error between the set of triples of data points and an estimated set of triples of data points estimated using the current model.

13. A controller for controlling an operation of a machine according to a model of the machine having uncertainties, comprising:
a memory for storing a model of the machine having uncertainties; and
a processor for controlling the machine iteratively over a set of control steps according to the model, got storing in the memory a set of triples of data points representing the operation of the machine over a period of time, wherein a triple of data points in the set includes two subsequent states of the machine and corresponding control input causing a transition of the machine between the subsequent states, and for updating the model such that the model is within a feasible space of models of the machine corresponding to a polytope with vertices defined by base models representing extreme values of different parameters of the model, wherein the processor updates the model by solving a constrained optimization problem minimizing an error between the set of triples of data points and an estimated set of triples of data points estimated using the model, wherein the constrained optimization problem is subject to barycentric constraints enforcing that the generalized barycentric coordinates of the model are non-negative and a sum of the generalized barycentric coordinates of the model equals to one, such that the processor controls the operation of the machine using the current model.

14. A method for controlling an operation of a machine according to a model of the machine having uncertainties, wherein the method uses a processor coupled with stored instructions implementing the method, wherein the instructions, when executed by the processor carry out at least some steps of the method, comprising:
determining a set of triples of data points representing the operation of the machine over a period of time, wherein a triple of data points in the set includes two subsequent states of the machine and corresponding control input causing a transition of the machine between the subsequent states;
determining a current model of the machine based on the set of triples of data points, such that the current model is within a feasible space of models of the machine corresponding to a polytope with vertices defined by base models representing extreme values of different parameters of the model, further comprising:
determining multiple subsets of triples of data points;
determining a sample model of the machine for each subsets of triples of data points to produce a set of sample models, wherein each sample model is within the feasible space; and
determining a probability distribution over the current model using the set of sample models; and
controlling the operation of the machine using the current model.

15. A method for controlling an operation of a machine according to a model of the machine having uncertainties, wherein the method uses a processor coupled with stored instructions implementing the method, wherein the instructions, when executed by the processor carry out at least some steps of the method, comprising:

determining a set of triples of data points representing the operation of the machine over a period of time, wherein a triple of data points in the set includes two subsequent states of the machine and corresponding control input causing a transition of the machine between the subsequent states;

determining a current model of the machine based on the set of triples of data points, such that the current model is within a feasible space of models of the machine corresponding to a polytope with vertices defined by base models representing extreme values of different parameters of the model; and controlling the operation of the machine using the current model iteratively over a set of control steps using control inputs satisfying control-invariant constraints on the control inputs selected such that any value of a control input satisfying the control-invariant constraints maintains a state of the machine in a control-invariant subset of states satisfying constraints on the operation of the machine, wherein for any state of the machine within the control-invariant subset there is an admissible control input satisfying the control-invariant constraints and maintaining the state of the machine within the control-invariant set.

* * * * *